(12) United States Patent
Ichise et al.

(10) Patent No.: US 11,551,711 B2
(45) Date of Patent: Jan. 10, 2023

(54) COBALT FERRITE MAGNETIC POWDER, METHOD OF PRODUCING THE SAME, AND MAGNETIC RECORDING MEDIUM

(71) Applicant: Sony Group Corporation, Tokyo (JP)

(72) Inventors: Natsuki Ichise, Tokyo (JP); Masaru Terakawa, Tokyo (JP); Katsunori Maeshima, Tokyo (JP); Takashi Kataguchi, Tokyo (JP); Takeshi Takahashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/430,874

(22) PCT Filed: Feb. 14, 2020

(86) PCT No.: PCT/JP2020/005791
§ 371 (c)(1),
(2) Date: Aug. 13, 2021

(87) PCT Pub. No.: WO2020/166701
PCT Pub. Date: Aug. 20, 2020

(65) Prior Publication Data
US 2022/0036919 A1    Feb. 3, 2022

(30) Foreign Application Priority Data

Feb. 15, 2019   (JP) .............................. JP2019-025771

(51) Int. Cl.
*G11B 5/706*     (2006.01)
*H01F 1/34*      (2006.01)

(52) U.S. Cl.
CPC ......... *G11B 5/70678* (2013.01); *H01F 1/344* (2013.01)

(58) Field of Classification Search
None
See application file for complete search history.

(56) References Cited

U.S. PATENT DOCUMENTS 3,425,666 A * 2/1969 Lindquist ........... G11B 5/70678
                                                252/62.62
4,975,324 A * 12/1990 Torii ........................ G11B 5/85
                                                427/128

(Continued)

FOREIGN PATENT DOCUMENTS

JP    S 6121921 A    1/1986
JP    S 6181608 A    4/1986

(Continued)

OTHER PUBLICATIONS

Gaikwad et al. (Int. J. of Electrochem., 2011, 729141, 6 pages) (Year: 2011).*

(Continued)

*Primary Examiner* — Kevin M Bernatz
(74) *Attorney, Agent, or Firm* — K&L Gates LLP

(57) ABSTRACT

A cobalt ferrite magnetic powder includes magnetic particles that have a uniaxial crystal magnetic anisotropy and contain cobalt ferrite. A peak top 2θ of a (3, 1, 1) plane determined by powder X-ray diffractometry using a CoKα ray is 41.3° or more and 41.5° or less. Some Cos contained in the magnetic particles are substituted with at least one selected from the group consisting of Zn, Ge, and a transition metal element other than Fe.

19 Claims, 4 Drawing Sheets

(56) References Cited

U.S. PATENT DOCUMENTS

| | | | |
|---|---|---|---|
| 7,326,360 B1* | 2/2008 | Jiles | C22C 29/12 |
| | | | 252/62.51 R |
| 2006/0292403 A1* | 12/2006 | Yamamoto | C01G 53/006 |
| | | | 252/62.62 |
| 2015/0017443 A1* | 1/2015 | Pattayil | C04B 35/64 |
| | | | 264/611 |
| 2020/0211743 A1* | 7/2020 | Yamamoto | H01F 1/10 |
| 2020/0231462 A1* | 7/2020 | Ansari | C01G 37/006 |
| 2020/0248288 A1* | 8/2020 | Imaoka | C22C 38/04 |
| 2020/0265976 A1* | 8/2020 | Yamamoto | C22C 33/02 |

FOREIGN PATENT DOCUMENTS

| | | |
|---|---|---|
| JP | S 6218006 A | 1/1987 |
| JP | 2003123227 A | 4/2003 |
| JP | 2012156437 A | 8/2012 |
| WO | WO 2015025465 A1 | 2/2015 |
| WO | WO 2017138532 A1 | 8/2017 |
| WO | WO 2019082604 A1 | 5/2019 |

OTHER PUBLICATIONS

Zare et al. (J. Mol. Struc., 1089, 2015, 25-31. (Year: 2015).*
Vinosha P. et al. (Optik, 127, 2016, 9917-9925. (Year: 2016).*
Sontu et al. (J. Mag. Mag. Mat., 374, 2015, 376-380. (Year: 2015).*
IDS reference to Ponce A.S. et al. (J. Mag. Mag. Mat., 344, 2013, 182-187). (Year: 2013).*
Ponce A.S. et al. "High coercivity induced by mechanical milling in cobalt Ferrite powders" Journal of Magnetism and Magnetic Materials vol. 344, Oct. 2013, pp. 182-187.
Translation of International Search Report dated Aug. 20, 2020 connection with PCT/JP2020/005791.

* cited by examiner

COBALT FERRITE MAGNETIC POWDER, METHOD OF PRODUCING THE SAME, AND MAGNETIC RECORDING MEDIUM

TECHNICAL FIELD

The present disclosure relates to a cobalt ferrite magnetic powder, a method of producing the same, and a magnetic recording medium.

BACKGROUND ART

In recent years, a cobalt ferrite magnetic powder is expected as a coating-type magnetic powder for high-density magnetic recording medium. As a method of producing the cobalt ferrite magnetic powder, a method of introducing an additive into a magnetic powder and a method of introducing a lattice defect into a magnetic powder by mechanical milling have been proposed (see, for example, Patent Literature 1).

CITATION LIST

Non-Patent Literature

Non-Patent Literature 1 Ponce A. S. et al. "High coercivity induced by mechanical milling in cobalt Ferrite powders" Journal of Magnetism and Magnetic Materials Volume 344, October 2013, Pages 182-187

DISCLOSURE OF INVENTION

Technical Problem

However, in the cobalt ferrite magnetic powder obtained by the production method proposed above, there is a possibility that the variation of a coercive force Hc is large.

It is an object of the present disclosure to provide a cobalt ferrite magnetic powder, a method of producing the same, and a magnetic recording medium that are capable of suppressing the variation of the coercive force Hc.

Solution to Problem

In order to achieve the above-mentioned object, a first disclosure is a cobalt ferrite magnetic powder, including: magnetic particles that have a uniaxial crystal magnetic anisotropy and contain cobalt ferrite, in which a peak top $2\theta$ of a (3, 1, 1) plane determined by powder X-ray diffractometry using a CoKα ray is 41.3° or more and 41.5° or less, and some Cos contained in the magnetic particles are substituted with at least one selected from the group consisting of Zn, Ge, and a transition metal element other than Fe.

A second disclosure is a method of producing a cobalt ferrite magnetic powder, including: melting a component for forming glass and a component for forming a cobalt ferrite magnetic powder and then quenching the components to prepare an amorphous body; and performing heat treatment on the amorphous body to precipitate the cobalt ferrite magnetic powder, in which the cobalt ferrite magnetic powder includes magnetic particles containing cobalt ferrite, some Cos contained in the magnetic particles are substituted with at least one selected from the group consisting of Zn, Ge, and a transition metal element other than Fe, and oxygen partial pressure during the heat treatment is 1.0 kPa or less.

Figure 2:
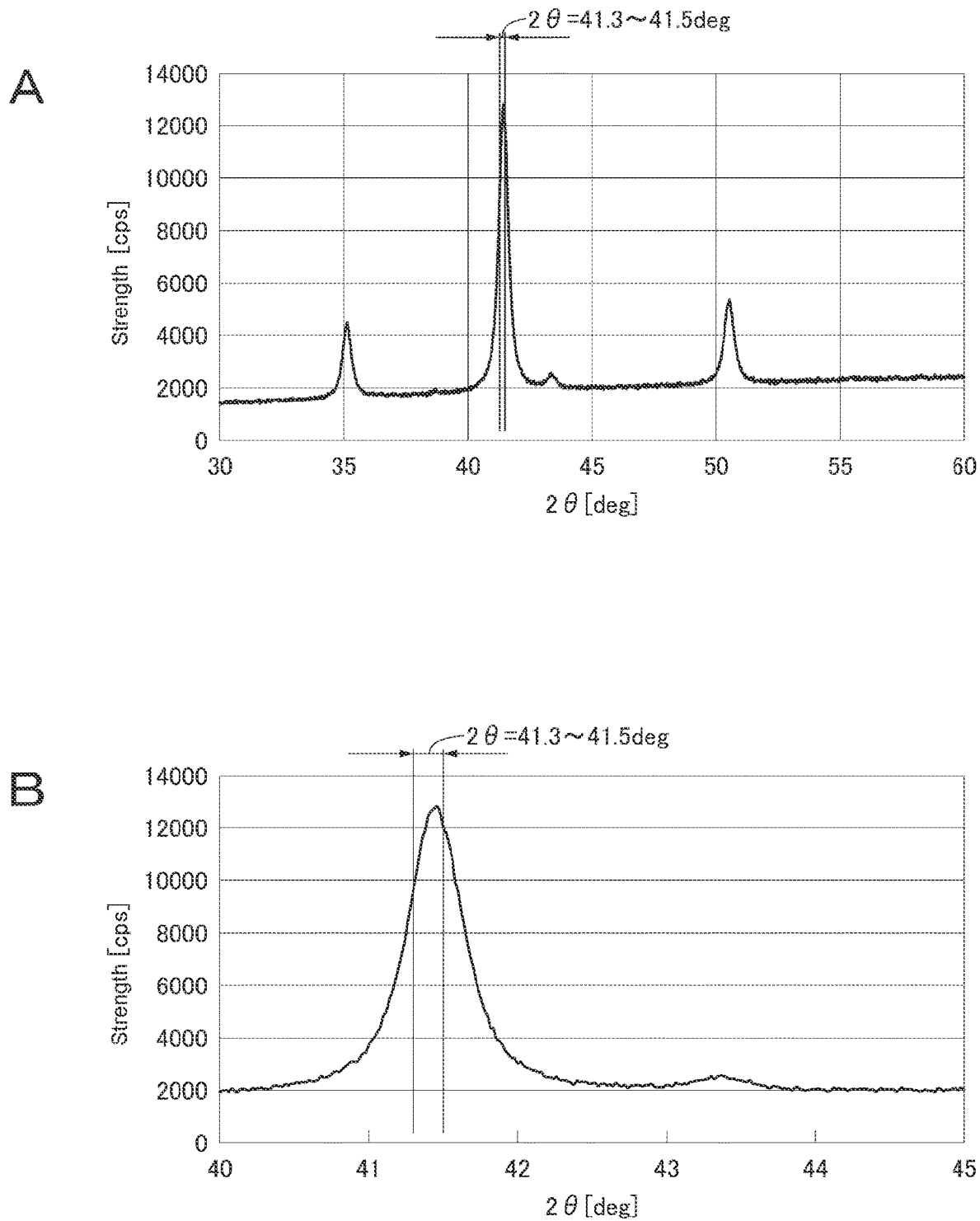

Part A of FIG. 2 is a diagram showing an X-ray diffraction spectrum of a magnetic powder according to an Example 1. Part B of FIG. 2 is an enlarged view of a part of Part A of FIG. 2.

Figure 3:
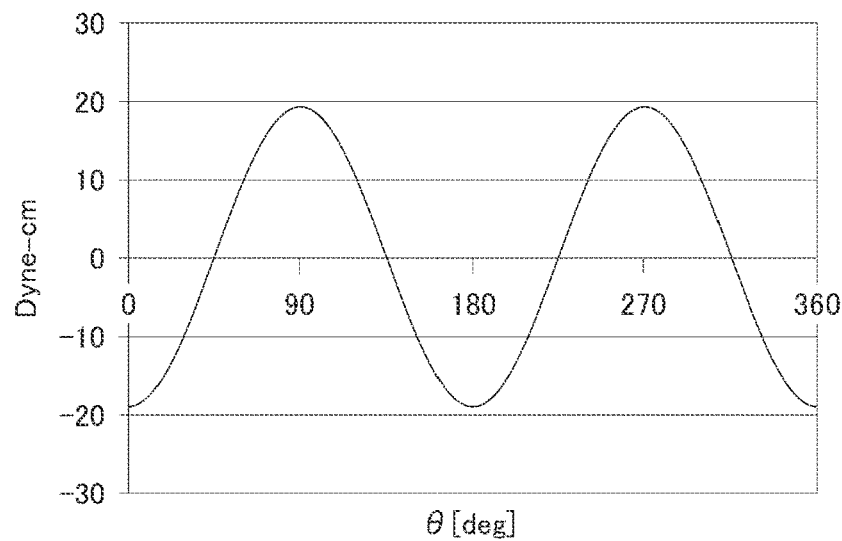
Figure 3:
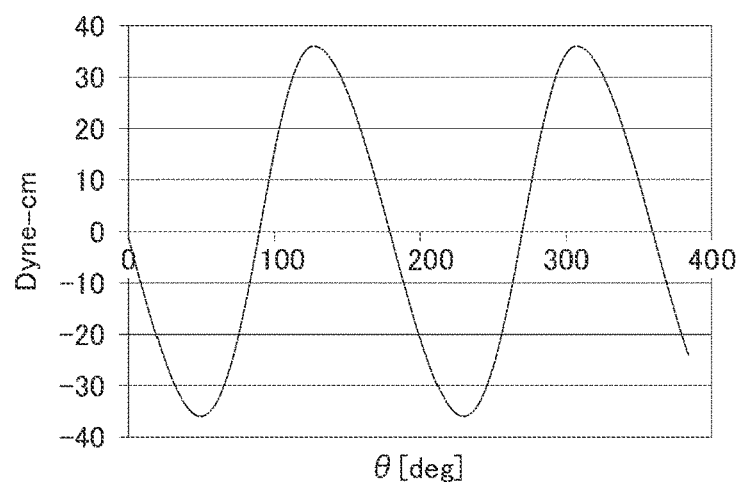
Figure 3:
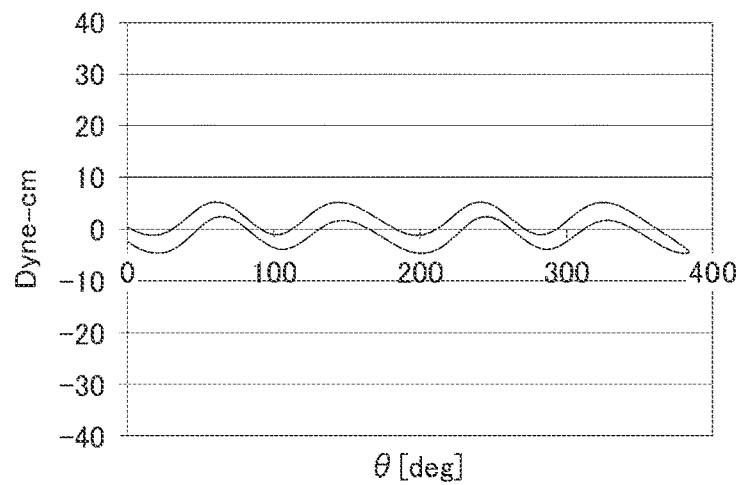

Part A of FIG. 3 is a diagram showing a magnetic torque waveform of the magnetic powder according to the Example 1. Part B of FIG. 3 is a diagram showing a magnetic torque waveform of a magnetic powder according to a Comparative Example 2. Part C of FIG. 3 is a diagram showing a magnetic torque waveform of a magnetic powder according to a Comparative Example 3.

Figure 4:
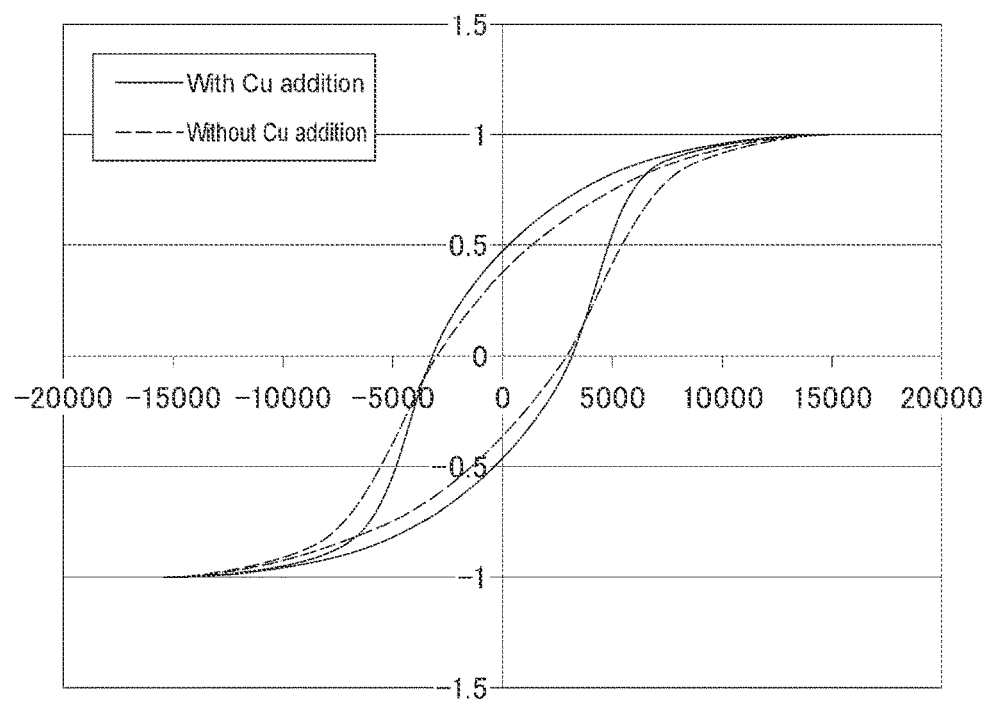
Figure 4:
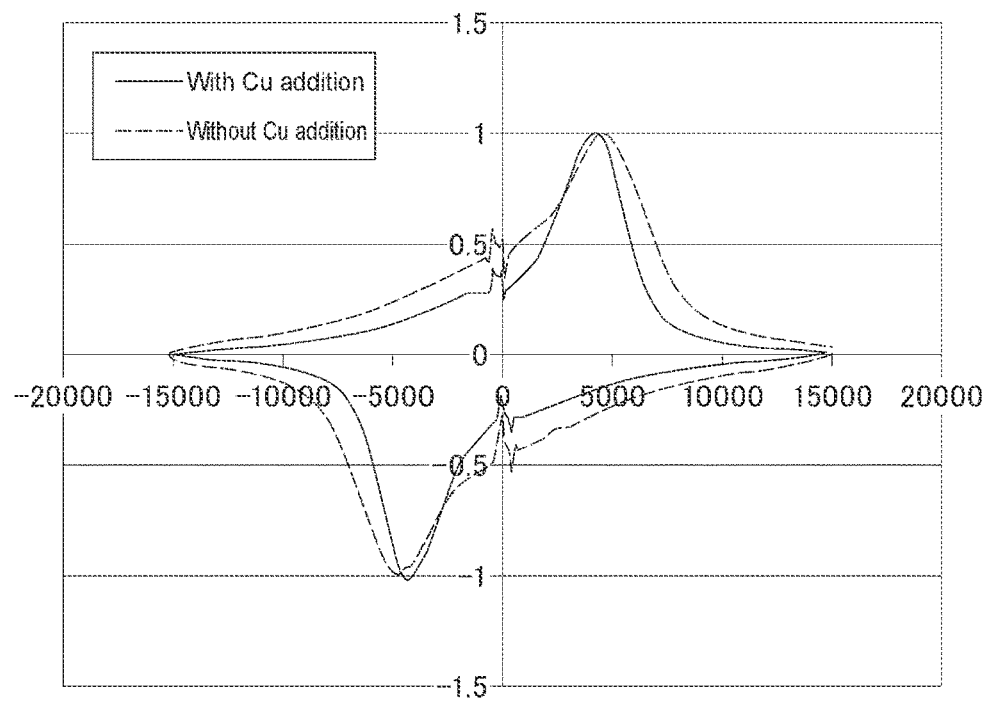

Part A of FIG. 4 is a diagram showing hysteresis curves of the magnetic powders according to the Example 1 and a Comparative Example 1. Part B of FIG. 4 is a diagram showing SFD curves of the magnetic powders according to the Example 1 and the Comparative Example 1.

MODE(S) FOR CARRYING OUT THE INVENTION

Embodiments of the present disclosure will be described in the following order.
1 First embodiment
1.1 Magnetic powder
1.2 Method of producing magnetic powder
1.3 Effects
2 Second embodiment
2.1 Configuration of magnetic recording medium
2.2 Method of producing magnetic powder
2.3 Effects

1 First Embodiment

[1.1 Magnetic Powder]

First a magnetic powder according to a first embodiment of the present disclosure will be described. The magnetic powder is a magnetic powder for a tape-shaped magnetic recording medium, and includes magnetic particles containing cobalt ferrite (hereinafter, the "cobalt ferrite particles".) as a main phase. The cobalt ferrite particles have, for example, a cubic shape or a substantially cubic shape. The cobalt ferrite has an inverse-spinel crystalline structure. Note that hereinafter, the magnetic powder including cobalt ferrite particles will be referred to as the cobalt ferrite magnetic powder in some cases.

The cobalt ferrite particles have a uniaxial crystal magnetic anisotropy. Since the cobalt ferrite particles have a uniaxial crystal magnetic anisotropy, the cobalt ferrite particles can be perpendicularly oriented When preparing a magnetic recording medium using the magnetic powder according to the first embodiment. Therefore, it is possible to reduce the noise of the magnetic recording medium.

The fact that the cobalt ferrite particles have a uniaxial crystal magnetic anisotropy can be confirmed as follows.

(1) First, a tape-shaped magnetic recording medium is prepared using a magnetic powder. Note that when preparing a magnetic layer, the magnetic field of the magnetic powder is oriented in the perpendicular direction of the magnetic recording medium (thickness direction of the magnetic recording medium) or the longitudinal direction of the magnetic recording medium. Subsequently, the prepared magnetic recording medium is cut into three pieces in a predetermined size. Subsequently, the three pieces are attached on top of each other, and then both surfaces thereof are attached with a mending tape to obtain a laminate. The obtained laminate is punched with a round punch having a diameter φ=6.25 to obtain a sample having a circular shape.

(2) Next, the obtained sample is AC demagnetized. This processing is performed considering that in the case of using a sample in a magnetized state, the magnetization is saturated when an external magnetic field is applied, and there is a possibility that the output numerical value of the torque is not normal.

(3) Next, the sample is set to a measuring apparatus. Specifically, in the case where the magnetic powder is perpendicularly oriented, the sample is set perpendicularly to the direction of the applied magnetic field. Meanwhile, in the case where the magnetic powder is longitudinally oriented, the sample is set horizontally to the direction of the applied magnetic field.

(4) Next, zero magnetic field adjustment is performed on a measuring apparatus (manufactured by Toei Industry Co., Ltd., TRT-2 type), and then an external magnetic field of 15000 Oe is applied in the torque angle measurement mode to measure the torque waveform. In the case where the measured torque waveform fluctuates at intervals of 180°, it can be determined that the cobalt ferrite particles have a uniaxial crystal magnetic anisotropy.

Some Cos contained in the cobalt ferrite is substituted with at least one selected from the group consisting of Zn, Ge, and a transition metal element other than Fe. Since some Cos are substituted as described above, it is possible to suppress the variation of the coercive force Hc. In the following description, an element substituted for some Cos contained in the cobalt ferrite is referred to as "additive element" in some cases. From the viewpoint of improving the effect of suppressing the variation of the coercive force Hc, a transition metal element favorably contains one or more selected from the group consisting of Mn, Ni, Cu, Ta, and Zr, and contains, particularly favorably, Cu of these elements. Further, from the viewpoint of improving the effect of suppressing the variation of the coercive force Hc, some Cos contained in the cobalt ferrite are favorably substituted with Cu and at least one selected from the group consisting of Mn, Ni, Ta, Zr, Zn, and Ge.

The Cobalt ferrite has, for example, the average composition represented by the following formula (1).

$$Co_xM_yFe_2O_z \quad (1)$$

(however, in the formular (1), M represents at least one selected from the group consisting of Zn, Ge, and a transition metal element other than Fe. The transition metal element is favorably one or more selected from the group consisting of Mn, Ni, Cu, Ta, and Zr, and is, particularly favorably, Cu of these elements. x represents a value within the range of $0.4 \leq x \leq 1.0$. y represents a value within the range of $0 \leq y \leq 0.3$. However, x and y satisfy the relationship represented by the following formula: $(x+y) \leq 1.0$. z represents a value within the range of $3 \leq z \leq 4$. Some Fes may be substituted with other metal elements.)

(Peak Top 2θ)

A peak top 2θ of the (3, 1, 1) plane in the case where the magnetic powder is analyzed by powder X-ray diffractometry using a CoKα ray (Co tube) is 41.3° or more and 41.5° or less. In the case where no distortion occurs in cobalt ferrite, the above-mentioned peak top 2θ appears within a range of 41.3° or more and 41.5° or less. Meanwhile, in the case where distortion occurs in cobalt ferrite, the above-mentioned peak top 2θ appears at a position deviated from the range of 41.3° or more and 41.5° or less. Therefore, the expression of the effect of suppressing the variation of the coercive force Hc in the magnetic powder according to this embodiment is not caused by the introduction of a lattice defect into the crystalline structure of cobalt ferrite (occurrence of distortion of the crystalline structure of cobalt ferrite).

The above-mentioned peak top 2θ of the (3, 1, 1) plane is measured as follows by using an X-ray diffractometer (X-ray diffraction: XRD) equipped with a Co tube. First, a sample holder for powder X-ray diffractometry is filled with a magnetic powder to prepare a measurement sample. At this time, the surface of the sample is made flat by sliding it with a glass plate or the like. Next, powder X-ray diffractometry (concentration method, CoKα ray) is performed using the prepared measurement sample to obtain the peak top 2θ of a peak due to the (3, 1, 1) plane of the magnetic powder.

Details of conditions of the above-mentioned measurement are shown below.

X-ray diffractometer: Sample horizontal multi-purpose X-ray diffractometer (manufactured by Rigaku, Ultima IV)

Tube: CoKα ray (wavelength $\lambda=1.79$ Å) Analysis software: PDXL-2

(Molar Ratio (Co/Fe))

The molar ratio (Co/Fe) of Co to Fe contained in cobalt ferrite is favorably 0.2 or more and less than 0.5, more favorably 0.2 or more and 0.45 or less, still more favorably 0.2 or more and 0.4 or less, and particularly favorably 0.2 or more and 0.35 or less. When the molar ratio (Co/Fe) is 0.2 or more, it is possible to suppress the reduction of the coercive force Hc due to a decrease in the content of Fe or Co having magnetism. When Some Cos contained in cobalt ferrite are substituted with at least one selected from the group consisting of Zn, Ge, and a transition metal element other than Fe, the molar ratio (Co/Fe) is less than 0.5. Therefore, when the molar ratio (Co/Fe) is less than 0.5, it is possible to suppress the variation of the coercive force Hc.

The molar ratio (Co/Fe) is calculated from the analytical value of inductively coupled plasma-emission spectroscopy (ICP-AES) as follows. First, 0.1 g of the sample is subjected to wet decomposition using acid, and then the sample is filled up to 100 ml and analyzed qualitatively and semi-quantitatively using ICP-AES as a sample solution. One prepared by performing the same procedure as that for the sample on water is used as a blank sample. Next, the molar ratio (Co/Fe) is obtained from the molar concentration of Fe and Co obtained from the measurement.

(Average Particle Size)

The average particle size of the magnetic powder is favorably 25 nm or less, more favorably 10 nm or more and 25 nm or less, and still more favorably 10 nm or more and 23 nm or less. When the average particle size is 10 nm or more, the generation of superparamagnetism can be suppressed. Therefore, it is possible to suppress the deterioration of the magnetic properties of the magnetic powder. In the magnetic recording medium 10, the region that is half the size of the recording wavelength is the actual magnetization region. For this reason, by setting the average particle size of the magnetic powder to half or less of the shortest recording wavelength, it is possible to achieve favorable electromagnetic conversion characteristics. In the case where the average particle size of the magnetic powder is 25 nm or less, it is possible to achieve favorable electromagnetic conversion characteristics in the magnetic recording medium 10 configured to be capable of recording signals at the shortest recording wavelength of 50 nm or less. In this specification, the electromagnetic conversion characteristics are, for example, CNR (Carrier to Noise Ratio).

The average particle size of the magnetic powder is obtained as follows. First, the magnetic powder is observed by a scanning transmission electron microscope (STEM) to acquire a STEM image. Next, 300 cobalt ferrite particles are randomly selected from the acquired STEM image, and an area S of each of the particles is obtained. Next, assuming that the shapes of the particles are circular, a particle size (diameter) R of each of the particles is calculated as the particle size from the following formula (2) to obtain the particle size distribution of the magnetic powder.

$$R = 2 \times (S/\pi)1/2 \tag{2}$$

Next, the median diameter (50% diameter, D50) is obtained from the obtained particle size distribution, and is used as the average particle size.

(Relative Standard Deviation)

The relative standard deviation of the magnetic powder represented by the following formula (3) is favorably 50% or less.

$$\text{Relative standard deviation [\%]} = ([\text{Standard deviation of particle size}]/[\text{Average particle size}]) \times 100 \tag{3}$$

When the relative standard deviation is 50% or less, it is possible to suppress the variation of the particle size of the magnetic powder. Therefore, it is possible to suppress the variation of the magnetic properties such as the coercive force Hc of the magnetic powder.

The above-mentioned relative standard deviation of the particle size of the magnetic powder is obtained as follows. First, the average particle size is obtained in a manner similar to the method of calculating the average particle size described above. Next, the standard deviation of the particle size is obtained from the particle size distribution used in obtaining the average particle size. Next, the relative standard deviation is obtained by substituting the average particle size and the standard deviation of the particle size obtained as described above into the above-mentioned formula (3).

(Coercive Force Hc)

The coercive force Hc of the magnetic powder is 2500 Oe or more, favorably 2600 Oe or more and 3500 Oe or less. When the coercive force Hc 2500 Oe or more, the recording region can be strictly maintained in the case where the magnetic powder is applied to a magnetic recording medium, and favorable electromagnetic conversion characteristics can be achieved. Meanwhile, when the coercive force Hc is 3500 Oe or less, saturation recording by a recording head is made possible, and favorable electromagnetic conversion characteristics can be achieved.

The above-mentioned coercive force Hc of the magnetic powder is obtained as follows. First, a magnetic powder sample having a predetermined shape is prepared. The magnetic powder sample can be freely prepared to the extent that it does not affect the measurement, such as compaction to a capsule for measurement and sticking to a tape for measurement. Next, the M-H loop of the magnetic powder sample is obtained using a vibrating sample magnetometer (VSM), and then the coercive force Hc is obtained from the obtained M-H loop. Note that the measurement of the M-H loop described above is performed under an environment of room temperature (25° C.)

(SFD)

The distribution of the coercive force Hc can be evaluated by SFD (Switching Field Distribution). In the SFD curves of the magnetic powder (see Part B of FIG. 4), the SFD is obtained by Ha/Hc when the half-value width (full width at half maximum) of the main peak is Ha and the coercive force of the magnetic powder is Hc. The SFD is favorably 2.0 or less, more favorably 1.5 or less, still more favorably 1.0 or less, and particularly favorably 0.5 or less.

The SFD is obtained by measuring the magnetization to the magnetic field with an apparatus and measurement conditions similar to those in the measurement of the above-mentioned coercive force Hc and normalizing the full width at half maximum Ha of the differential curve with the coercive force Hc.

(Saturation Magnetization σs)

The lower limit value of a saturation magnetization σs of the magnetic powder is, for example, 50 emu/g or more, favorably 60 emu/g or more, and more favorably 70 emu/g or more. When the saturation magnetization σs is 60 emu/g or more, since high output can be achieved even in the case where the magnetic layer 13 is thin, it is possible to achieve favorable electromagnetic conversion characteristics. Note that such a high saturation magnetization amount σs can be obtained by the cobalt ferrite magnetic powder, and it is difficult to obtain such a high saturation magnetization amount σs in the barium ferrite magnetic powder. Note that since the saturation magnetization amount σs of the barium ferrite magnetic powder is approximately 50 emu/g and the saturation magnetization amount σs is insufficient for thinning the layer of the magnetic layer 13, the reproduction output of the magnetization signal is weakened and there is a possibility that favorable electromagnetic conversion characteristics cannot be achieved.

The upper limit value of the saturation magnetization amount σs of the magnetic particles is favorably 85 emu/g or less. When the saturation magnetization amount σs exceeds 85 emu/g, since a GMR (Giant Magnetoresistive) head, a TMR (Tunneling Magnetoresistive) head, or the like for reading the magnetization signal is saturated, there is a possibility that the electromagnetic conversion characteristics are reduced.

The above-mentioned saturation magnetization amount σs is obtained as follows. That is, the M-H loop of the magnetic powder sample is obtained in a manner similar to the above-mentioned method of measuring the coercive force Hc of the magnetic powder, and then the saturation magnetization amount σs is obtained from the obtained M-H loop.

[1.2 Method of Producing Magnetic Powder]

Next, the method of producing the magnetic powder according to the first embodiment of the present disclosure will be described. This method of producing the magnetic powder includes preparing a cobalt ferrite magnetic powder using a component for forming glass and a component for forming a cobalt ferrite magnetic powder (hereinafter, referred to simply as the "component for forming a magnetic powder") by a glass crystallization method.

(Step of Mixing Raw Materials)

First, the component for forming glass and the component for forming a magnetic powder are mixed to obtain a mixture.

The component for forming glass contains sodium borate ($Na_2B_4O_7$). When the component for forming glass contains sodium borate, the component for forming a magnetic powder can be dissolved in glass in the step of melting and amorphization described below. Further, quenching conditions for vitrification in the step of melting and amorphization described below are relaxed. As a result, the amorphous body can be obtained also by placing the melt into water to quench the melt instead of quenching the melt using a twin-roll quenching apparatus. Further, in the step of taking out the magnetic powder described below, the crystallized glass (non-magnetic component) is removed by hot water or the like, and the magnetic powder can be taken out.

The ratio of sodium borate to the total amount of the component for forming glass and the component for forming a magnetic powder is favorably 35 mol % or more and 60 mol % or less. When the ratio of sodium borate is 35 mol % or more, it is possible to obtain an amorphous body having high homogeneity. Meanwhile, when the ratio of sodium borate is 60 mol % or less, it is possible to suppress the reduction in the amount of the magnetic powder to be obtained.

It is favorable that the component for forming glass further includes at least one of an oxide of an alkaline earth metal or a precursor of the oxide. In the case where the component for forming glass further includes at least one of an oxide of an alkaline earth metal or a precursor of the oxide, the glass softening point of the glass can be increased, and the component for forming a magnetic powder can be crystallized at a temperature near the glass softening point. Therefore, it is possible to suppress the glass from being softened and the precipitated magnetic powder from being sintered at the time point when reaching the temperature at which the component for forming a magnetic powder is crystallized.

The oxide of an alkaline earth metal includes, for example, at least one of calcium oxide (CaO), strontium oxide (SrO), or barium oxide (BaO), and includes, particularly favorably, at least one of strontium oxide or barium oxide of these oxides. This is because the effect of increasing the glass softening point by strontium oxide or barium oxide is higher than that of increasing the glass softening point by calcium oxide. Note that in the case where calcium oxide is used as the oxide of an alkaline earth metal, it is favorable to use calcium oxide in combination with at least one of strontium oxide or barium oxide from the viewpoint of increasing the glass softening point.

As the precursor of an oxide of an alkaline earth metal, a material that generates an oxide of an alkaline earth metal by heating at the time of melting in the step of melting and amorphization described below is favorable. Examples of such a material include, but are not limited to, a carbonate of an alkaline earth metal. The carbonate of an alkaline earth metal includes, for example, at least one of calcium carbonate ($CaCO_3$), strontium carbonate ($SrCO_3$), or barium carbonate ($BaCO_3$), and includes, particularly favorably, at least one of strontium carbonate or barium carbonate of these oxides. Since the oxide of an alkaline earth metal is unstable by being combined with $CO_2$ or moisture in air, it is possible to perform accurate measurement by using, as the component for forming glass, a precursor of an oxide of an alkaline earth metal (e.g., a carbonate of an alkaline earth metal) rather than an oxide of an alkaline earth metal.

The molar ratio of the oxide of an alkaline earth metal to sodium borate (oxide of an alkaline earth metal/sodium borate) is favorably 0.25 or more and 0.5 or less. When the above-mentioned molar ratio is less than 0.25, the glass softening point of the glass becomes low, and there is a possibility that the glass is softened before enough crystallinity is imparted to the magnetic powder in the step of crystallization described below. Therefore, there is a possibility that the precipitated magnetic powder is sintered to increase the particle size of the magnetic powder. Meanwhile, when the above-mentioned molar ratio exceeds 0.5, the glass softening point of the glass becomes too high, a hexagonal ferrite magnetic powder precipitates with a cobalt ferrite magnetic powder, and there is a possibility that the variation of the coercive force Hc of the magnetic powder becomes large. Therefore, there is a possibility that in the case where the magnetic powder is applied to the magnetic recording medium 10, S/N is reduced.

The component for forming a magnetic powder includes at least one of cobalt oxide (CoO) or a precursor of cobalt oxide, iron oxide ($Fe_2O_3$), and a compound of an additive element. Since the component for forming a magnetic powder includes a compound of an additive element as described above, the speed of the particle growth is slowed down in the step of crystallization (step of heat treatment) described below, and uniformity of the particle size can be improved. Therefore, it is possible to suppress the variation of the coercive force Hc. As the precursor of cobalt oxide, a material that generates cobalt oxide by heating at the time of melting in the step of melting and amorphization described below is favorable. Examples of such a material include, but are not limited to, cobalt carbonate ($CoCO_3$).

The compound of an additive element includes, for example, at least one selected from the group consisting of an oxide of a transition metal element other than Co and Fe, a precursor of the oxide of a transition metal element other than Co and Fe, zinc oxide, a precursor of zinc oxide, germanium oxide, and a precursor of germanium oxide.

The oxide of a transition metal element other than Co and Fe includes, favorably, at least one selected from the group consisting of manganese oxide (e.g., MnO), nickel oxide (e.g., $NiO_2$), copper oxide (e.g., $Cu_2O$), tantalum oxide (e.g., $Ta_2O_5$), and zirconium oxide (e.g., $ZrO_2$) from the viewpoint of improving the uniformity of the particle size, and include, particularly favorably, copper oxide of these oxides.

As the precursor of an oxide of a transition metal element other than Co and Fe, a material that generates an oxide of a transition metal element other than Co and Fe by heating at the time of melting in the step of melting and amorphization described below is favorable. Examples of such a material include, but are not limited to, a carbonate of a transition metal element other than Co and Fe. The carbonate of a transition metal element other than Co and Fe includes, favorably, at least one selected from the group consisting of manganese carbonate, nickel carbonate, copper carbonate, tantalum carbonate, and zirconium carbonate from the viewpoint of improving the uniformity of the particle size, and includes, particularly favorably, copper carbonate of these carbonates.

As the precursor of zinc oxide, a material that generates zinc oxide by heating at the time of melting in the step of melting and amorphization described below is favorable. Examples of such a material include zinc carbonate. As the precursor of germanium oxide, a material that generates germanium oxide by heating at the time of melting in the step of melting and amorphization described below is favorable. Examples of such a material include germanium carbonate.

(Step of Melting and Amorphization)

Next, the obtained mixture is heated at a high temperature (e.g., approximately 1400° C.) and melted to obtain a melt, and then the melt is quenched to obtain an amorphous body (glass body). Here, even if a microcrystalline material is partially precipitated, there is no problem as long as it does not become coarse at the time of heat treatment to be performed later.

As a method of quenching the melt, for example, a liquid quenching method such as a metal twin-roll method and a single-roll method, or a method of charging the melt into water can be used, but the method of charging the melt into water is favorable from the viewpoint of simplifying a manufacturing facility.

(Step of Crystallization)

Subsequently, by performing heat treatment on the amorphous body with a heating apparatus to crystallize the amorphous body, a cobalt ferrite magnetic powder is precipitated in the crystallized glass to obtain a magnetic powder-containing material. At this time, since the magnetic powder is precipitated in the crystallized glass (non-magnetic component), it is possible to prevent the particles from being sintered with each other and obtain a magnetic powder of fine particle sizes. Further, since heat treatment is performed on the amorphous body at a high temperature, it is possible to obtain a magnetic powder having favorable crystallinity and a high magnetization ($\sigma s$).

The heat treatment is performed in an atmosphere with an oxygen concentration lower than that of the atmospheric atmosphere. By performing the heat treatment in such an atmosphere, it is possible to improve the coercive force Hc of the magnetic powder and impart a uniaxial crystal magnetic anisotropy to the magnetic powder. The oxygen partial pressure during the heat treatment is 1.0 kPa or less, favorably 0.9 kPa or less, more favorably 0.5 kPa or less, and still more favorably 0.1 k Pa or less. Note that the oxygen partial pressure of the atmospheric atmosphere is 21 kPa. When the oxygen partial pressure during the heat treatment is 1.0 kPa or less, the coercive force Hc of the magnetic powder can be made 2500 Oe or more. In order to make the oxygen concentration of the atmosphere during the heat treatment lower than that in the atmospheric atmosphere, nitrogen or an inert gas such as an Ar gas may be introduced into a heating apparatus housing the amorphous body, or the inside of the heating apparatus may be evacuated to be in a low-pressure state using a vacuum pump.

It is favorable that the temperature of the heat treatment exceeds the Curie temperature of the magnetic powder. Specifically, the temperature of the heat treatment is favorably 550° C. or more and 670° C. or less, more favorably 590° C. or more and 650° C. or less, e.g., approximately 610° C. When the temperature of the heat treatment is 550° C. or more, the cobalt ferrite particles (cobalt ferrite magnetic powder) can be precipitated, and some Cos contained in the precipitated cobalt ferrite particles can be substituted with additive elements. Meanwhile when the temperature of the heat treatment is 650° C. or less, it is possible to suppress the particle size distribution from becoming broad.

The time of the heat treatment is favorably 0.5 hours or more and 20 hours or less, more favorably 1.0 hour or more and 10 hours or less. When the time of the heat treatment is 0.5 or more, some Cos contained in the precipitated cobalt ferrite particles can be substituted with additive elements. Meanwhile, when the time of the heat treatment is 20 hours or less, it is possible to suppress the reduction in the productivity of the magnetic powder.

It is favorable that the glass softening point of the glass that is a non-magnetic component and the crystallization temperature of the component for forming a magnetic powder are close to each other. When the glass softening point is low and the glass softening point and the crystallization temperature are apart from each other, the glass softens at the time point when reaching the temperature for crystallizing the component for forming a magnetic powder, and there is a possibility that the precipitated magnetic powder is easily sintered and the size of the magnetic powder becomes large.

(Step of Taking Out Magnetic Powder)

After that, for example, the crystallized glass that is a non-magnetic component is removed by weak acid or hot water to take out the magnetic powder. As a result, the target magnetic powder is obtained.

[1.3 Effects]

In the magnetic powder according to the first embodiment, some Cos contained in cobalt ferrite are substituted with at least one selected from the group consisting of Zn, Ge, and a transition metal element other than Fe as described above, it is possible to suppress the variation of the coercive force Hc.

2 Second Embodiment

[2.1 Configuration of Magnetic Recording Medium]

Figure 1:
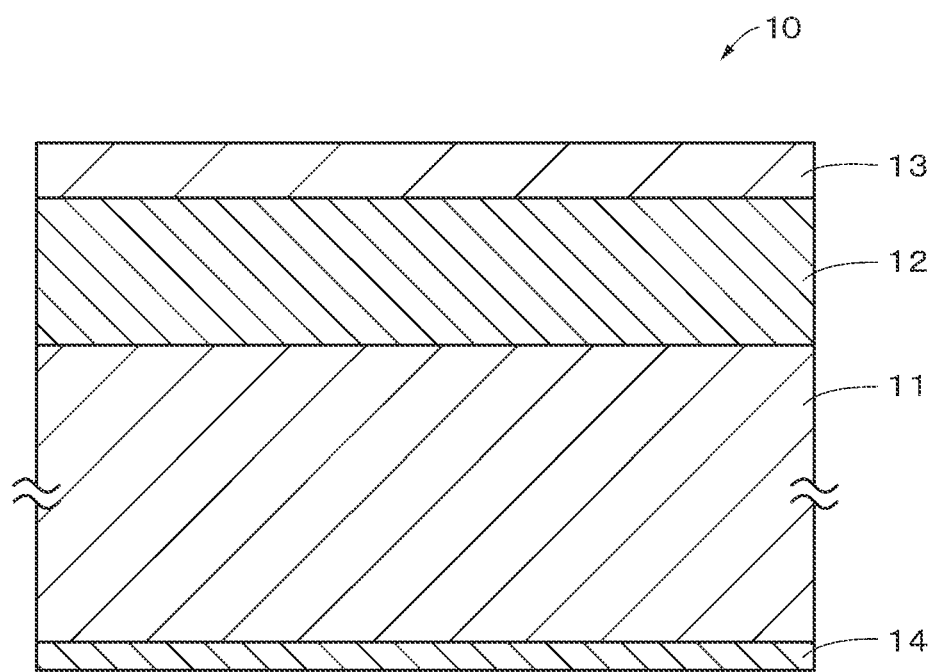
FIG. 1 is a cross-sectional view of a magnetic recording medium according to a second embodiment of the present disclosure.

First, the magnetic recording medium 10 according to the second embodiment of the present disclosure will be described with reference to FIG. 1. The magnetic recording medium 10 includes an elongated base 11, an underlayer 12 provided on one main surface of the base 11, a magnetic layer 13 provided on the underlayer 12, and a back layer 14 provided on the other main surface of the base 11. Note that the underlayer 12 and the back layer 14 are provided as necessary and do not necessarily need to be provided.

The magnetic recording medium 10 has an elongated tape-like shape, and is caused to travel in a longitudinal direction during recording and reproduction. From the viewpoint of improving the recording density, the magnetic recording medium 10 is configured to be capable of recording a signal at the shortest recording wavelength of favorably 50 nm or less, more favorably 46 nm or less. In view of the effect of the magnetic powder size on transition widths, the magnetic recording medium 10 is configured to be capable of recording a signal at the shortest recording wavelength of favorably 30 nm or more. The line recording density of the magnetic recording medium 10 is favorably 500 kbpi or more and 850 kbpi or less.

The magnetic recording medium 10 is favorably used in a recording/reproduction apparatus including a ring-type head as a recording head. The magnetic recording medium 10 may be used in a library apparatus. In this case, the library apparatus may include a plurality of recording/reproduction apparatuses described above.

Note that in this specification, the "perpendicular direction" means a direction perpendicular to the surface of the magnetic recording medium 10 in a flat state (i.e., the thickness direction of the magnetic recording medium 10), and the "longitudinal direction" means a longitudinal direction (traveling direction) of the magnetic recording medium 10.

(Base)

The base 11 is a non-magnetic support that supports the underlayer 12 and the magnetic layer 13. The base 11 has an elongated film-like shape. The upper limit value of the average thickness of the base 11 is favorably 4.2 μm or less, more favorably 3.8 μm or less, and still more favorably 3.4 μm or less. When the upper limit value of the average thickness of the base 11 is 4.2 μm or less, the recording capacity in one data cartridge can be made higher than that of a typical magnetic recording medium. The lower limit value of the average thickness of the base 11 is favorably 3 μm or more. When the lower limit value of the average thickness of the base 11 is 3 μm or more, a reduction in the strength of the base 11 can be suppressed.

The average thickness of the base 11 is obtained as follows. First, the magnetic recording medium 10 having a ½-inch width is prepared and cut into the length of 250 mm to prepare a sample. Subsequently, layers other than the base 11 of the sample (i.e., the underlayer 12, the magnetic layer 13, and the back layer 14) are removed with a solvent such as MEK (methyl ethyl ketone) and dilute hydrochloric acid. Next, the thickness of the sample (the base 11) is measured at positions of five or more points using a laser hologage manufactured by Mitutoyo as a measuring apparatus, and the measured values are simply averaged (arithmetically averaged) to calculate the average thickness of the base 11. Note that the measurement positions are randomly selected from the sample.

The base 11 contains, for example, at least one of polyesters, polyolefins, cellulose derivatives, vinyl resins, and different polymeric resins. In the case where the base 11 contains two or more of the above-mentioned materials, the two or more materials may be mixed, copolymerized, or stacked.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl resins include, for example, at least one of PVC (polyvinyl chloride) or PVDC (polyvinylidene chloride).

The different polymer resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

(Magnetic Layer)

The magnetic layer 13 is a perpendicular recording layer for recording signals. The magnetic layer 13 has a uniaxial magnetic anisotropy in the perpendicular direction. That is, the easy axis of magnetization of the magnetic layer 13 is directed to the perpendicular direction. The magnetic layer 13 includes, for example, a magnetic powder and a binder. The magnetic layer 13 may further include, as necessary, at least one additive of a lubricant, an antistatic agent, an abrasive, a curing agent, a rust inhibitor, non-magnetic reinforcing particles, and the like.

The average thickness of the magnetic layer 13 is favorably 40 nm or more and 90 nm or less, more favorably 40 nm or more and 70 nm or less, still more favorably 40 nm or more and 60 nm or less, and particularly favorably 40 nm or more and 50 nm or less. When an average thickness t of the magnetic layer 13 is 40 nm or more, since output can be ensured in the case where an MR-type head is used as the reproduction head, it is possible to improve the electromagnetic conversion characteristics. Meanwhile, when the average thickness of the magnetic layer 13 is 90 nm or less, since the magnetization can be uniformly recorded in the thickness direction of the magnetic layer 13 in the case where a ring-type head is used as the recording head, it is impossible to improve the electromagnetic conversion characteristics.

The average thickness of the magnetic layer 13 is obtained as follows. First, the magnetic recording medium 10 is thinly processed perpendicularly to the main surface thereof by a FIB (Focused Ion Beam) method or the like to prepare a slice, and the cross section of the slice is observed by a transmission electron microscope (TEM) to obtain a TEM image. The apparatus and observation conditions are shown below.

Apparatus: TEM (manufactured by Hitachi, Ltd., H9000NAR)

Acceleration voltage: 300 kV

Magnification: 100,000 times

Next, the obtained TEM image is used to measure the thickness of the magnetic layer 13 at positions of at least 10 points in the longitudinal direction of the magnetic recording medium 10, and then the measured values are simply averaged (arithmetically averaged) to obtain the average thickness of the magnetic layer 13. Note that the measurement positions are randomly selected from the sample piece.

(Magnetic Powder)

The magnetic powder is the above-mentioned magnetic powder according to the first embodiment. The magnetic powder is oriented in the perpendicular direction. Since the magnetic powder according to the first embodiment has a uniaxial crystal magnetic anisotropy as described above, the magnetic powder can be perpendicularly oriented. Therefore, the noises of the magnetic recording medium 10 can be reduced. Note that in the present disclosure, the "orientation direction of the magnetic powder" means a direction in which a larger squareness ratio is obtained, of the perpendicular direction and the longitudinal direction of the magnetic recording medium 10.

The easy axis of magnetization of the cobalt ferrite particles is favorably directed to the perpendicular direction or substantially perpendicular direction. That is, the magnetic powder is favorably dispersed within the magnetic layer 13 such that the square or substantially square surfaces of the cobalt ferrite particles are perpendicular or substantially perpendicular to the thickness direction of the magnetic layer 13. In the case of cubic or substantially cubic cobalt ferrite particles, the area of contact between the particles in the thickness direction of the medium can be reduced and agglomeration of the particles can be suppressed as compared with hexagonal plate-shaped barium ferrite particles. That is, the dispersibility of the magnetic powder can be increased.

It is favorable that the square or substantially square surfaces of the cobalt ferrite particles are exposed from the surface of the magnetic layer 13. Performing short-wavelength recording by a magnetic head on the square or substantially square surfaces of the cobalt ferrite particles is advantageous in terms of high-density recording as compared with the case of performing short-wavelength recording on the hexagonal-shaped surface of the hexagonal plate-shaped barium ferrite magnetic powder having the same volume. From the viewpoint of high-density recording, it is favorable that the surface of the magnetic layer 13 is filled with square or substantially square surfaces of cobalt ferrite particles.

(Binder)

Examples of the binder include a thermoplastic resin, a thermosetting resin, and a reactive resin. Examples of the thermoplastic resin include, for example, vinyl chloride, vinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of thermosetting resin include a phenol resin, an epoxy resin, a polyurethane curable resin, a urea resin, a melamine resin, an alkyd resin, a silicone resin, a polyamine resin, and a urea formaldehyde resin.

For the purpose of improving the dispersibility of the magnetic powder, a polar functional group such as $-SO_3M$, $-OSO_3M$, $-COOM$, $P=O(OM)_2$ (where M represents a hydrogen atom or an alkali metal such as lithium, potassium, and sodium), a side chain amine having a terminal group represented by $-NR1R2$ or $-NR1R2R3^+X^-$, a main chain amine represented by $>NR1R2^+X^-$ (where R1, R2, and R3 each represent a hydrogen atom or a hydrocarbon group, and $X^-$ represents a halogen element ion such as fluorine, chlorine, bromine, and iodine, an inorganic ion, or an organic ion.), $-OH$, $-SH$, $-CN$, and an epoxy group may be introduced into all of the binders described above. The amount of these polar functional groups to be introduced into the binder is favorably $10^{-1}$ to $10^{-8}$ mol/g, and more favorably $10^{-2}$ to $10^{-6}$ mol/g.

(Lubricant)

Examples of the lubricant include esters of monobasic fatty acids having 10 to 24 carbon atoms and one of monovalent to hexavalent alcohols having 2 to 12 carbon atoms, mixed esters thereof, a difatty acid ester, and a trifatty acid ester. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

(Antistatic Agent)

Examples of the antistatic agent include carbon black, a natural surfactant, a nonionic surfactant, and a cationic surfactant.

(Abrasive)

Examples of the abrasive include α-alumina having an a transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating and annealing the raw material of magnetic iron oxide, and those surface-treated with aluminum and/or silica as necessary.

(Curing Agent)

Examples of the curing agent include polyisocyanate. Examples of the polyisocyanate include aromatic polyisocyanates such as an adduct of tolylene diisocyanate (TDI) and an active hydrogen compound, and aliphatic polyisocyanates such as an adduct of hexamethylene diisocyanate (HMDI) and an active hydrogen compound. The weight average molecular weight of these polyisocyanates is desirably in the range of 100 to 3000.

(Rust Inhibitor)

Examples of the rust inhibitor include phenols, naphthols, quinones, heterocyclic compounds containing a nitrogen atom, heterocyclic compounds containing an oxygen atom, and heterocyclic compounds containing a sulfur atom.

(Non-Magnetic Reinforcing Particle)

Examples of the non-magnetic reinforcing particles include aluminum oxide (α-, β-, or γ-alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 12 is for alleviating the unevenness of the surface of the base 11 and adjusting the unevenness of the surface of the magnetic layer 13. The underlayer 12 may include a lubricant to provide the lubricant to the surface of the magnetic layer 13. The underlayer 12 is a non-magnetic layer including a non-magnetic powder and a binder. The underlayer 12 may further include at least one additive of a lubricant, an antistatic agent, a curing agent, a rust inhibitor, or the like as necessary.

The average thickness of the underlayer 12 is favorably 0.6 µm or more and 2.0 µm or less, more favorably 0.8 µm or more and 1.4 µm or less. Note that the average thickness of the underlayer 12 is obtained in a manner similar to that for the average thickness of the magnetic layer 13. However, the magnification of the TEM image is appropriately adjusted in accordance with the thickness of the underlayer 12.

(Non-Magnetic Powder)

The non-magnetic powder includes, for example, at least one of an inorganic particle powder or an organic particle powder. Further, the non-magnetic powder may include a carbon powder such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include various shapes such as a needle shape, a spherical shape, a cubic shape, and a plate shape, but are not limited to these shapes.

(Binder)

The binder is similar to that in the magnetic layer 13 described above.

(Additive)

The lubricant, the antistatic agent, the curing agent, and the rust inhibitor are similar to those in the magnetic layer 13 described above.

(Back Layer)

The back layer 14 includes a binder and a non-magnetic powder. The back layer 14 may further include at least one additive of a lubricant, a curing agent, an antistatic agent, or the like as necessary. The lubricant and the antistatic agent are similar to those in the magnetic layer 13 described above. Further, the non-magnetic powder is similar to that in the underlayer 12 described above.

The average particle size of the non-magnetic powder is favorably 10 nm or more and 150 nm or less, more favorably 15 nm or more and 110 nm or less. The average particle size of the non-magnetic powder is obtained in a manner similar to that for the average particle size of the magnetic powder described above. The non-magnetic powder may include a non-magnetic powder having two or more particle size distributions.

The upper limit value of the average thickness of the back layer 14 is favorably 0.6 µm or less. When the upper limit value of the average thickness of the back layer 14 is 0.6 µm or less, since the thickness of the underlayer 12 or the base 11 can be kept thick even in the case where the average thickness of the magnetic recording medium 10 is 5.6 µm or less, it is possible to maintain the traveling stability of the magnetic recording medium 10 in the recording/reproduction apparatus. The lower limit value of the average thickness of the back layer 14 is not particularly limited, but is, for example, 0.2 µm or more.

The average thickness of the back layer 14 is obtained as follows. First, the magnetic recording medium 10 having a ½-inch width is prepared and cut into the length of 250 mm to prepare a sample. Next, the thickness of the sample is measured at positions of five or more points using a laser hologage manufactured by Mitutoyo as a measuring apparatus, and the measured values are simply averaged (arithmetically averaged) to calculate an average thickness T [µm] of the magnetic recording medium 10. Note that the measurement positions are randomly selected from the sample. Subsequently, the back layer 14 of the sample is removed with a solvent such as MEK (methyl ethyl ketone) and dilute hydrochloric acid. After that, the thickness of the sample is measured at positions of five or more points using the above-mentioned laser hologage again, and the measured values are simply averaged (arithmetically averaged) to calculate an average thickness $t_1$ [µm] of the magnetic recording medium 10 from which the back layer 14 has been removed. Note that the measurement positions are randomly selected from the sample. After that, the average thickness t [µm] of the back layer 14 is obtained by the following formula.

$$t[\mu m]=T[\mu m]-T_1[\mu m]$$

(Average Thickness of Magnetic Recording Medium)

The upper limit value of the average thickness (average total thickness) of the magnetic recording medium 10 is favorably 5.6 µm or less, more favorably 5.0 µm or less, and still more favorably 4.4 µm or less. When the average thickness of the magnetic recording medium 10 is 5.6 µm or less, the recording capacity in one data cartridge can be made higher than that of a typical magnetic recording medium. The lower limit value of the average thickness of the magnetic recording medium 10 is not particularly limited, but is, for example, 3.5 µm or more.

The average thickness of the magnetic recording medium 10 is obtained by the procedure described in the abovementioned method of measuring the average thickness of the back layer 14.

(Total Thickness of Magnetic Layer and Under Layer)

The total sum of the average thicknesses of the magnetic layer 13 and the underlayer 12 is favorably 1.1 µm or less, more favorably 0.8 µm or less, and still more favorably 0.6 µm or less. When the total thickness of the average thicknesses of the magnetic layer 13 and the underlayer 12 is 1.1 µm or less, the ratio of the magnetic layer 13 included per unit volume increases, making it possible to improve the volume capacity. The lower limit value of the total thickness of the average thicknesses of the magnetic layer 13 and the underlayer 12 is favorably 0.3 µm or more from the viewpoint of supplying the lubricant from the underlayer 12. The method of measuring the average thickness of each of the underlayer 12 and the magnetic layer 13 is as described above.

(Coercive Force Hc)

The coercive force Hc of the magnetic recording medium 10 in the perpendicular direction is favorably 2500 Oe or more and 4000 Oe or less, more favorably 2500 Oe or more and 3500 Oe or less, and still more favorably 2500 Oe or more and 3000 Oe or less. When the coercive force Hc is 2500 Oe or more, it is possible to suppress the reduction of the electromagnetic conversion characteristics in a high-temperature environment due to the effect of thermal disturbance and the effect of the demagnetizing field. Meanwhile, when the coercive force Hc is 4000 Oe or less, it is possible to suppress the generation of portions where recording cannot be performed due to the difficulty of saturation recording in the recording head. Therefore, the noise is suppressed from increasing, and it is possible to suppress the reduction of the electromagnetic conversion characteristics as a result.

The coercive force Hc is obtained as follows. First, a measurement sample is cut from the elongated magnetic recording medium 10, and the M-H loop of the entire measurement sample is measured in the perpendicular direction (thickness direction) of the measurement sample using the VSM. Next, the coating film (the underlayer 12, the magnetic layer 13, the back layer 14, and the like) is wiped off using acetone, ethanol, or the like, only the base 11 is left as a sample for background correction, and the M-H loop of the base 11 is measured in the perpendicular direction (thickness direction) of the base 11 using the VSM. After that, the M-H loop of the base 11 is subtracted from the M-H loop of the entire measurement sample to obtain the M-H loop after background correction. The coercive force Hc is obtained from the obtained M-H loop. Note that the measurement of the M-H loops described above is performed at 25° C. Further, the "demagnetizing field correction" is not performed when the M-H loop is measured in the perpendicular direction of the magnetic recording medium 10.

(Squareness Ratio)

A squareness ratio $S_1$ of the magnetic recording medium 10 in the perpendicular direction (thickness direction) is 65% or more, favorably 70% or more, and more favorably 75% or more. When the squareness ratio $S_1$ is 65% or more, since the perpendicular orientation of the magnetic powder is sufficiently high, it is possible to achieve excellent electromagnetic conversion characteristics.

The squareness ratio $S_1$ is obtained as follows. First, the M-H loop after background correction is obtained in a manner similar to the above-mentioned method of measuring the coercive force Hc. Next, a saturation magnetization Ms (emu) and a residual magnetization Mr (emu) of the obtained M-H loop are substituted into the following formula to calculate the squareness ratio $S_1$ (%).

$$\text{Squareness ratio } S_1(\%)=(Mr/Ms)\times 100$$

A squareness ratio $S_2$ of the magnetic recording medium 10 in the longitudinal direction (traveling direction) is favorably 35% or less, more favorably 30% or less, and still more favorably 25% or less. When the squareness ratio $S_2$ is 35% or less, since the perpendicular orientation of the magnetic power is sufficiently high, it is possible to achieve excellent electromagnetic conversion characteristics.

The squareness ratio $S_2$ is obtained in a manner similar to that for the squareness ratio $S_1$ except that the M-H loop is measured in the longitudinal direction (traveling direction) of the magnetic recording medium 10 and the base 11.

(Ratio L4/L2)

The ratio L4/L2 of a component L4 having a multiaxial crystal magnetic anisotropy to a component L2 having a uniaxial crystal magnetic anisotropy represents the strength of the uniaxial crystal magnetic anisotropy of the magnetic powder, the components being obtained by applying Fourier transformation to a torque waveform of the magnetic recording medium 10. The smaller the ratio L4/L2, the stronger the uniaxial crystal magnetic anisotropy of the magnetic powder. This ratio L4/L2 is 0 or more and 0.25 or less, favorably 0 or more and 0.20 or less, and more favorably 0 or more and 0.18 or less. When the ratio L4/L2 is 0 or more and 0.25 or less, since the uniaxial crystal magnetic anisotropy of the cobalt ferrite particles is sufficiently strong, it is possible to reduce noises. Therefore, it is possible to improve the electromagnetic conversion characteristics.

The above-mentioned ratio L4/L2 is obtained as follows. First, the torque waveform is measured in a manner similar to the method of confirming the fact that the cobalt ferrite particles have a uniaxial crystal magnetic anisotropy (confirmation method described in the first embodiment). However, the measurement sample is prepared using the magnetic recording medium 10 according to the second embodiment. After measuring the torque waveform, the ratio L4/L2 is obtained using the component L2 having a uniaxial crystal magnetic anisotropy and the component L4 having a multiaxial crystal magnetic anisotropy, the components being calculated and displayed after being subject to Fourier transformation automatically by the measuring apparatus.

[2.2 Method of Producing Magnetic Recording Medium]

Next, a method of producing the magnetic recording medium 10 having the above-mentioned configuration will be described. First, a coating material for forming an underlayer is prepared by kneading and dispersing a non-magnetic powder, a binder, and the like in a solvent. Next, a coating material for forming a magnetic layer is prepared by kneading and dispersing a magnetic powder, a binder, and the like in a solvent. For preparing the coating material for forming a magnetic layer and the coating material for forming an underlayer, for example, the following solvents, dispersing apparatus, and kneading apparatus can be used.

Examples of the solvent used for preparing coating materials include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the above-mentioned kneading apparatus used for the preparation of the coating materials, for example, a kneading apparatus such as a continuous twin-screw kneader, a continuous twin-screw kneader capable of diluting in multiple stages, a kneader, a pressure kneader, and a roll kneader can be used. However, the present disclosure is not particularly limited to these apparatuses. Further, as the above-mentioned dispersion apparatus used for the preparation of the coating materials, for example, a dispersion apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser can be used. However, the present disclosure is not particularly limited to these apparatuses.

Next, the coating material for forming an underlayer is applied to one main surface of the base 11 and dried to form the underlayer 12. Subsequently, the coating material for forming a magnetic layer is applied onto this underlayer 12 and dried to form the magnetic layer 13 on the underlayer 12. Note that during drying, the magnetic field of the magnetic powder is oriented in the thickness direction of the base 11 by, for example, a solenoidal coil. Further, during drying, the magnetic field of the magnetic powder may be oriented in the traveling direction (longitudinal direction) of the base 11 by, for example, a solenoid coil, and then the magnetic field may be oriented in the thickness direction of the base 11. After the magnetic layer 13 is formed, the back layer 14 is formed on the other main surface of the base 11. As a result, the magnetic recording medium 10 is obtained.

After that, the obtained magnetic recording medium 10 is wound around the large-diameter core, and the curing processing is performed thereon. Finally, calendering is performed on the magnetic recording medium 10, and then the magnetic recording medium 10 is cut into a predetermined width (e.g., ½-inch width). In this way, a desired long elongated magnetic recording medium 10 can be obtained.

[2.3 Effects]

As described above, the magnetic recording medium 10 according to the second embodiment includes the magnetic layer 13 that includes the magnetic powder according to the first embodiment. As a result, it is possible to achieve favorable electromagnetic conversion characteristics.

EXAMPLE

Hereinafter, the present disclosure will be specifically described by way of Examples, but the present disclosure is not limited to only these Examples.

In this Example, the average thickness of the base film (base), the average thickness of the magnetic layer, the average thickness of the underlayer, the average thickness of the back layer, and the average thickness of the magnetic tape (magnetic recording medium) are obtained by the above-mentioned measurement method described in the second embodiment.

Example 1

(Step of mixing raw materials) First, sodium tetraborate ($Na_2B_4O_7$) and strontium carbonate ($SrCO_3$) as the component for forming glass and iron oxide ($Fe_2O_3$), basic cobalt carbonate ($2CoCO_3.3Co(OH)_2$), and copper oxide ($Cu_2O$) as the component for forming a magnetic powder were prepared. Then, the prepared raw materials were mixed so that the molar ratio of $Na_2B_4O_7$:$SrCO_3$:$Fe_2O_3$:$2CoCO_3.3Co(OH)_2$: $Cu_2O$ became 51.7:20.7:22.4:2.9:2.3 to obtain a mixture.

(Step of Melting and Amorphization)

Next, the obtained mixture was heated at 1400° C. for 1 hour to be melt to obtain a melt, and then the melt was charged into water to obtain an amorphous body (glass body). Note that during the above-mentioned heating, carbonic acid is removed from strontium carbonate to generate strontium oxide. Further, carbonic acid is removed from basic cobalt carbonate to generate cobalt oxide.

(Step of Crystallization)

Subsequently, heat treatment was performed on the obtained amorphous body at 610° C. in an atmosphere of oxygen partial pressure of 0.1 kPa for 2.5 hours to crystallize the amorphous body, thereby precipitating a cobalt ferrite magnetic powder. As a result, a magnetic powder-containing material in which cobalt ferrite was precipitated in the crystallized glass was obtained.

(Step of Taking Out Magnetic Powder)

After that, the crystallized glass that is a non-magnetic component is mostly removed by hot water treatment, and then the extremely fine particles and residual glass are removed by thermal citric acid treatment. Then, a cobalt ferrite magnetic powder (($Co_{0.7}Cu_{0.3})_{0.7}$ $Fe_2O_4$) was obtained by performing centrifugation with a centrifugal force of 5000 G for 1 hour, vacuum-filtering, and drying.

(Analysis by X-Ray Diffraction)

The cobalt ferrite magnetic powder obtained as described above was analyzed by powder X-ray diffractometry, and the peak top 2θ of the (3, 1, 1) plane was measured. The results are shown in Part A of FIG. 2 and Part B of FIG. 2. Part B of FIG. 2 is an enlarged view of the range of 2θ=40~45° in Part A of FIG. 2. Note that the measurement was performed by the method of measuring the peak top 2θ described in the first embodiment. From Part A of FIG. 2 and Part B of FIG. 2, it is confirmed that the peak top 2θ appears within the range of 41.3° or more and 41.5° or less. Therefore, it can be seen that no distortion occurs in the crystalline structure of cobalt ferrite in the Example 1.

Example 2

A cobalt ferrite magnetic powder (($Co_{0.6}Cu_{0.4})_{0.7}Fe_2O_4$) was obtained in a manner similar to that in the Example 1 except that the prepared raw materials were mixed so that the molar ratio of $Na_2B_4O_7$: $SrCO_3$:$Fe_2O_3$:$2CoCO_3$.$3Co(OH)_2$: $Cu_2O$ became 51.7:20.7:22.4:2.7:2.5.

Example 3

A cobalt ferrite magnetic powder (($Co_{0.7}Zn_{0.3})_{0.7}Fe_2O_4$) was obtained in a manner similar to that in the Example 1 except that zinc oxide (ZnO) was prepared instead of copper oxide ($Cu_2O$) and the prepared raw materials were mixed so that the molar ratio of $Na_2B_4O_7$:$SrCO_3$:$Fe_2O_3$:$2CoCO_3$.$3Co(OH)_2$: ZnO became 51.7:20.7:22.4:2.9:2.3 to obtain a mixture.

Example 4

A cobalt ferrite magnetic powder (($Co_{0.7}Mn_{0.3})_{0.7}Fe_2O_4$) was obtained in a manner similar to that in the Example 1 except that manganese carbonate ($MnCO_3$) was prepared instead of copper oxide ($Cu_2O$) and the prepared raw materials were mixed so that the molar ratio of $Na_2B_4O_7$: $SrCO_3$:$Fe_2O_3$:$2CoCO_3$.$3Co(OH)_2$: $MnCO_3$ become 51.7:20.7:22.4:2.9:2.3 to obtain a mixture.

Example 5

A cobalt ferrite magnetic powder (($Co_{0.7}Ni_{0.3})_{0.7}Fe_2O_4$) was obtained in a manner similar to that in the Example 1 except that germanium oxide (NiO) was prepared instead of copper oxide ($Cu_2O$) and the prepared raw materials were mixed so that the molar ratio of $Na_2B_4O_7$:$SrCO_3$:$Fe_2O_3$: $2CoCO_3$.$3Co(OH)_2$:NiO was 51.7:20.7:22.4:2.9:2.3 to obtain a mixture.

Example 6

A cobalt ferrite magnetic powder (($Co_{0.7}Ge_{0.3})_{0.7}Fe_2O_4$) was obtained in a manner similar to that in the Example 1 except that germanium oxide ($GeO_2$) was prepared instead of copper oxide ($Cu_2O$) and the prepared raw materials were mixed so that the molar ratio of $Na_2B_4O_7$:$SrCO_3$:$Fe_2O_3$: $2CoCO_3$.$3Co(OH)_2$: $GeO_2$ became 51.7:20.7:22.4:2.9:2.3 to obtain a mixture.

Example 7

A cobalt ferrite magnetic powder (($Co_{0.7}Ta_{0.3})_{0.7}Fe_2O_4$) was obtained in a manner similar to that in the Example 1 except that tantalum oxide ($Ta_2O_5$) was prepared instead of copper oxide ($Cu_2O$) and the prepared raw materials were mixed so that the molar ratio of $Na_2B_4O_7$:$SrCO_3$:$Fe_2O_3$: $2CoCO_3$.$3Co(OH)_2$: $Ta_2O_5$ became 51.7:20.7:22.4:2.9:2.3 to obtain a mixture.

Example 8

A cobalt ferrite magnetic powder (($Co_{0.7}Zr_{0.3})_{0.7}Fe_2O_4$) was obtained in a manner similar to that in the Example 1 except that zirconium oxide ($ZrO_2$) was prepared instead of copper oxide ($Cu_2O$) and the prepared raw materials were mixed so that the molar ratio of $Na_2B_4O_7$:$SrCO_3$:$Fe_2O_3$: $2CoCO_3$.$3Co(OH)_2$: $ZrO_2$ became 51.7:20.7:22.4:2.9:2.3 to obtain a mixture.

Comparative Example 1

First, sodium tetraborate ($Na_2B_4O_7$) and strontium carbonate ($SrCO_3$) as a component for forming glass and iron oxide ($Fe_2O_3$) and basic cobalt carbonate ($2CoCO_3$.$3Co(OH)_2$) as a component for forming a magnetic powder were prepared. Then, the prepared raw materials were mixed so that the molar ratio of $Na_2B_4O_7$:$SrCO_3$: $Fe_2O_3$:$2CoCO_3$.$3Co(OH)_2$ became 54.3:19.0:23.0:3.7 to obtain a mixture.

A cobalt ferrite magnetic powder ($CoFe_2O_4$) was obtained in a manner similar to that in the Example except the above.

Comparative Example 2

(Step of mixing raw materials) First, sodium tetraborate ($Na_2B_4O_7$) as a component for forming glass and iron oxide($Fe_2O_3$) and barium carbonate ($BaCO_3$) as a component for forming a magnetic powder were prepared. Then, the prepared raw materials were mixed so that the molar ratio of $Na_2B_4O_7$:$Fe_2O_3$: $BaCO_3$: $TiO_2$ became 40.0:32.2: 22.0:5.8 to obtain a mixture.

(Step of Melting and Amorphization)

Next, the obtained mixture was heated at 1350° C. for 80 minutes to be melted to obtain a melt, and then this melt was charged into water to obtain an amorphous body (glass body). Note that during the above-mentioned heating, carbonic acid is removed from barium carbonate to generate barium oxide.

(Step of Crystallization)

Subsequently, heat treatment was performed on the obtained amorphous body at 575° C. in the atmosphere for 8 hours to crystalize the amorphous body, thereby precipitating a barium ferrite magnetic powder. As a result, a magnetic powder-containing material in which a barium ferrite magnetic powder was precipitated in the crystallized glass was obtained.

(Step of taking out magnetic powder)

After that, the crystallized glass that is a non-magnetic component was removed by acetic acid washing, and then pure washing was performed. Then, a barium ferrite magnetic powder ($BaFe_{(11.08)}Ti_{0.92}O_{19}$) was obtained by performing centrifugation with a centrifugal force of 5000 G for 1 hour, vacuum-filtering, and drying.

Comparative Example 3

A cobalt ferrite particle powder having a multiaxial crystal magnetic anisotropy was prepared by a coprecipitation method.

[Evaluation of Magnetic Powder]

The molar ratio (Co/Fe), the average particle size, the relative standard deviation of the particle size, the saturation magnetization σs, the coercive force Hc, and SFD of the magnetic powder obtained as described above were measured by the above-mentioned method described in the first embodiment. Further, the squareness ratio Rs of the magnetic powder obtained as described above was obtained as follows. First, the M-H loop after background correction was obtained in a manner similar to the above-mentioned method of measuring the coercive force Hc. Next, a squareness ratio Rs (=(Mr/Ms)) was calculated using a saturation magnetization Ms (emu) and a residual magnetization Mr (emu) of the obtained M-H loop. Further, the absence or presence of the uniaxial crystal magnetic anisotropy of the magnetic powder obtained as described above was checked by the above-mentioned method described in the first embodiment. The results of the measurement and checking were shown in Table 1.

The magnetic torque waveforms measured when checking the absence or presence of the uniaxial crystal magnetic anisotropy are shown in Part A of FIG. 3 (Example 1), Part B of FIG. 3 (Comparative Example 2), and Part C of FIG. 3 (Comparative Example 3). The hysteresis curves obtained when measuring the coercive force Hc of the magnetic powder is shown in Part A of FIG. 4 (Example 1 and Comparative Example 1). The SFD curves obtained when measuring the SFD of the magnetic powder is shown in Part B of FIG. 4 (Example 1 and Comparative Example 1).

The raw materials, production conditions, and evaluations results of the magnetic powders according to the Examples 1 and 2 and Comparative Examples 1 to 3 are shown.

TABLE 1

|  | Example 1 | Example 2 | Comparative Example 1 | Comparative Example 2 | Comparative Example 3 |
| --- | --- | --- | --- | --- | --- |
| Magnetic powder Type | Cobalt ferrite (with Cu addition) | Cobalt ferrite (with Cu addition) | Cobalt ferrite (without Cu addition) | Barium ferrite (with Ti addition) | Cobalt ferrite (without Cu addition) |
| Molar ratio(Co/Fe) (Cu addition amount) | 0.25 | 0.21 | 0.5 | — | 0.5 |
| Average particle size [nm] | 20 | 20 | 20 | Plate diameter: 25 Thickness: 8 | 20 |
| Particle size Relative standard deviation[%] | 30 | 35 | 40 | Plate diameter: 25 Thickness: 25 | 40 |
| With/without Uniaxial crystal magnetic anisotropy | With | With | With | With | Without (Multiaxial crystal magnetic anisotropy) |
| σs[emu/g] | 60 | 58 | 65 | 51 | 66 |
| Hc[Oe] | 3150 | 3100 | 2950 | 2750 | 2750 |
| Rs | 0.45 | 0.48 | 0.35 | 0.5 | 0.5 |
| SFD | 1.3 | 1.1 | 2.3 | 0.8 | 2.3 |
| Raw material | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $Cu_2O$(Copper oxide) | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $Cu_2O$(Copper oxide) | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) | $Na_2B_4O_7$ (Sodium tetraborate) — $Fe_2O_3$(Iron oxide) $BaCO_3$ (Barium carbonate) $TiO_2$(Titanium oxide) | — — — — — |
| Glass melting | 1400° C. 1 h | 1400° C. 1 h | 1400° C. 1 h | 1350° C. 80 min | — |
| Crystallization annealing | 610° C., 2.5 h(In vaccum) | 610° C., 2.5 h(In vaccum) | 610° C., 2.5 h(In vaccum) | 575° C., 8 h (In air) | — |

The raw materials, production conditions, and evaluations results of the magnetic powders according to the Examples 3 to 8.

TABLE 2

|  | Example 3 | Example 4 | Example 5 | Example 6 | Example 7 | Example 8 |
| --- | --- | --- | --- | --- | --- | --- |
| Magnetic powder Type | Cobalt ferrite (with Zn addition) | Cobalt ferrite (with Mn addition) | Cobalt ferrite (with Ni addition) | Cobalt ferrite (with Ge addition) | Cobalt ferrite (with Ta addition) | Cobalt ferrite (with Zr addition) |
| Molar ratio(Co/Fe) (Addition amount of transition metal) | 0.25 | 0.25 | 0.25 | 0.25 | 0.25 | 0.25 |
| Average particle size[nm] | 20 | 20 | 20 | 20 | 20 | 20 |
| Particle size Relative standard deviation[%] | 35 | 36 | 38 | 36 | 36 | 37 |
| With/without Uniaxial crystal magnetic anisotropy | With | With | With | With | With | With |
| σs[emu/g] | 61 | 60 | 60 | 62 | 59 | 59 |
| Hc[Oe] | 2980 | 3050 | 2950 | 2990 | 3000 | 2960 |
| Rs | 0.42 | 0.42 | 0.41 | 0.41 | 0.41 | 0.43 |
| SFD | 1.5 | 1.4 | 1.6 | 1.5 | 1.5 | 1.6 |

TABLE 2-continued

|  | Example 3 | Example 4 | Example 5 | Example 6 | Example 7 | Example 8 |
|---|---|---|---|---|---|---|
| Raw material | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) (ZnO) Zinc oxide | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $(MnCO_3)$ Manganese carbonate | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $(NiO_2)$ Nickel oxide | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $(GeO_2)$ Germanium oxide | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $(Ta_2O_5)$ Tantalum oxide | $Na_2B_4O_7$ (Sodium tetraborate) $SrCO_3$ (Strontium carbonate) $Fe_2O_3$ (Iron oxide) $2CoCO_3 \cdot 3Co(OH)_2$ (Basic cobalt oxide) $(ZrO_2)$ Zirconium oxide |

The following can be seen from Table 1.

The SFD can be reduced in the cobalt ferrite magnetic powders according to the Examples 1 and 2 in which some Cos are substituted with Cu, as compared with the ferrite magnetic powders according to the Comparative Example 1 in which some Cos are not substituted with Cu. Therefore, it is possible to suppress the variation of the coercive force Hc.

The following can be seen from Table 2.

The SFD can be reduced also in the cobalt ferrite magnetic powders according to the Examples 3 to 8 in which some Cos are substituted with Zn, Mn, Ni, Ge, Ta, or Zr, similarly to the cobalt ferrite magnetic powders according to the Examples 1 and 2 in which some Cos are substituted with Cu. Therefore, it is possible to suppress the variation of the coercive force Hc.

It can be considered that the expression of the effect of reducing the SFD in the Examples 1 to 8 (i.e., the effect of suppressing the variation of the coercive force Hc) was due to the fact that the introduction of the additive element slowed the speed of particle growth in the step of crystallization (annealing step) and thus the particle size could be made uniform.

It can be seen from Part A of FIG. 2 and Part B of FIG. 2 that no distortion occurs in the crystalline structure of cobalt ferrite in the cobalt ferrite magnetic powder according to the Example 1 as described above. From this result, it is presumed that the expression of the effect of suppressing the variation of the coercive force Hc in the cobalt ferrite magnetic powder according to the Example 1 is not caused by the introduction of lattice defects (occurrence of distortion in the crystalline structure of cobalt ferrite) into the crystalline structure of cobalt ferrite.

The following can be seen from Part A of FIG. 3, Part B of FIG. 3, and Part C of FIG. 3.

In the magnetic torque waveforms (Part A of FIG. 3 and Part B of FIG. 3) of the cobalt ferrite magnetic powder according to the Example 1 and the barium ferrite magnetic powder according to the Comparative Example 2, the torque fluctuates at intervals of 180°. Therefore, the cobalt ferrite magnetic powder according to the Example 1 and the barium ferrite magnetic powder according to the Comparative Example 2 have a uniaxial crystal magnetic anisotropy.

Meanwhile, in the magnetic torque waveform (Part C of FIG. 3) of the cobalt ferrite magnetic powder according to the Comparative Example 1, the torque fluctuates at intervals of 90°. Therefore, the cobalt ferrite magnetic powder according to the Comparative Example 1 has a multiaxial crystal magnetic anisotropy (triaxial crystal magnetic anisotropy).

Although embodiments of the present disclosure have been specifically described above, the present disclosure is not limited to the above-mentioned embodiments and various modifications based on the technical idea of the present disclosure can be made.

For example, the configurations, the methods, the processes, the shapes, the materials, and the numerical values cited in the above-mentioned embodiments are only illustrative, and different configurations, methods, processes, shapes, materials, and numerical values may be used as necessary.

Further, the configurations, the methods, the processes, the shapes, the materials, and the numerical values in the above-mentioned embodiments can be combined without departing from the essence of the present disclosure.

In the numerical value range described stepwise in the above-mentioned embodiments, the upper limit value or the lower limit value of the numerical value range at a certain stage may be replaced by the upper limit value or the lower limit value of the numerical value range at another stage. As for the materials exemplified in the above-mentioned embodiments, unless otherwise specified, one type of the materials may be used alone or two or more types of the materials may be used in combination. In addition, the chemical formulae of compounds and the like are representative ones, and the valences and the like are not limited as long as they represent common names of the same compound.

In the first embodiment, the component for forming glass may contain at least one of sodium borate or a precursor of sodium borate.

In the first embodiment, the component for forming a magnetic powder may contain at least one of cobalt oxide or a precursor of cobalt oxide, at least one of iron oxide or a precursor of iron oxide, and a compound of an additive element.

In the first embodiment, the method of producing a magnetic powder may further include a step of heat treatment in magnetic field described below between the step of crystallization and the step of taking out a magnetic powder.

(Step of Heat Treatment in Magnetic Field)

Heat treatment is performed on the magnetic powder-containing material (amorphous body after heat treatment) again in a magnetic field by an annealing apparatus capable of applying a magnetic field. That is, it is also possible to perform heat treatment on the spinel ferrite magnetic powder again in a magnetic field while an inclusion (crystallized glass) is present between the particles of the spinel ferrite magnetic powder. This heat treatment in magnetic field imparts an anisotropy in the applied magnetic field direction to the precipitated spinel ferrite magnetic powder.

The heat treatment in magnetic field is performed in an atmosphere with an oxygen concentration lower than that of the atmospheric atmosphere. The oxygen partial pressure during the heat treatment is favorably 1.0 kPa or less, more favorably 0.9 kPa or less, still more favorably 0.5 kPa or less, and particularly favorably 0.1 kPa or less. When the oxygen partial pressure during the heat treatment is 1.0 kPa or less, the coercive force Hc of the spinel ferrite magnetic powder can be made 2500 Oe or more. In order to make the oxygen concentration of the atmosphere during the heat treatment lower than that in the atmospheric atmosphere, nitrogen or an inert gas such as an Ar gas may be introduced into an annealing apparatus housing the magnetic powder-containing material after heat treatment, or the inside of the annealing apparatus may be evacuated to be in a low-pressure state using a vacuum pump.

The temperature of the heat treatment in magnetic field is favorably 300° C. or more and 600° C. or less, more favorably 350° C. or more and 550° C. or less. The time of the heat treatment in magnetic field is favorably 1 hour or more and 10 hours or less, more favorably 2 hours or more and 5 hours or less.

It should be noted that the present disclosure may take the following configurations.

CLAIMS

(1) A cobalt ferrite magnetic powder, including:
magnetic particles that have a uniaxial crystal magnetic anisotropy and contain cobalt ferrite, in which
a peak top 2θ of a (3, 1, 1) plane determined by powder X-ray diffractometry using a CoKα ray is 41.3° or more and 41.5° or less, and
some Cos contained in the cobalt ferrite are substituted with at least one selected from the group consisting of Zn, Ge, and a transition metal element other than Fe.
(2) The cobalt ferrite magnetic powder according to (1), in which
a molar ratio (Co/Fe) of Co to Fe is 0.2 or more and less than 0.5.
(3) The cobalt ferrite magnetic powder according to (1) or (2), in which
the transition metal element include at least one selected from the group consisting of Mn, Ni, Cu, Ta, and Zr.
(4) The cobalt ferrite magnetic powder according to (1) or (2), in which
the transition metal element includes Cu.
(5) The cobalt ferrite magnetic powder according to any one of (1) to (4), in which
an average particle size is 25 nm or less.
(6) The cobalt ferrite magnetic powder according to any one of (1) to (5), in which
a relative standard deviation of a particle size is 50% or less.
(7) The cobalt ferrite magnetic powder according to any one of (1) to (6), in which
a coercive force Hc is 2500 Oe or more.
(8) The cobalt ferrite magnetic powder according to any one of (1) to (7), in which
SFD (Switching Field Distribution) is 2.0 or less.

(9) A tape-shaped magnetic recording medium, including:
a magnetic layer including the cobalt ferrite magnetic powder according to any one of (1) to (8).
(10) A method of producing a cobalt ferrite magnetic powder, including:
melting a component for forming glass and a component for forming a cobalt ferrite magnetic powder and then quenching the components to prepare an amorphous body; and
performing heat treatment on the amorphous body to precipitate the cobalt ferrite magnetic powder, in which
the cobalt ferrite magnetic powder includes magnetic particles containing cobalt ferrite,
some Cos contained in the cobalt ferrite are substituted with at least one selected from the group consisting of Zn, Ge, and a transition metal element other than Fe, and
oxygen partial pressure during the heat treatment is 1.0 kPa or less.
(11) The method of producing a cobalt ferrite magnetic powder according to (10), in which
the component for forming glass contains sodium borate.
(12) The method of producing a cobalt ferrite magnetic powder according to (11), in which
the component for forming glass further contains at least one of an oxide of an alkaline earth metal or a precursor of the oxide.
(13) The method of producing a cobalt ferrite magnetic powder according to (12), in which
the oxide of an alkaline earth metal includes at least one of calcium oxide, strontium oxide, or barium oxide.
(14) The method of producing a cobalt ferrite magnetic powder according to (12), in which
the oxide of an alkaline earth metal includes at least one of strontium oxide or barium oxide.
(15) The method of producing a cobalt ferrite magnetic powder according to any one of (11) to (14), in which
a ratio of the sodium borate to a total amount of the component for forming glass and the component for forming a cobalt ferrite magnetic powder is 35 mol % or more and 60 mol % or less.
(16) The method of producing a cobalt ferrite magnetic powder according to any one of (10) to (15), in which
the component for forming a cobalt ferrite magnetic powder contains
at least one of cobalt oxide or a precursor of the cobalt oxide,
iron oxide, and
at least one selected from the group consisting of an oxide of a transition metal element other than Co and Fe, a precursor of the oxide of a transition metal element other than Co and Fe, zinc oxide, a precursor of zinc oxide, germanium oxide, and a precursor of germanium oxide.
(17) The method of producing a cobalt ferrite magnetic powder according to any one of (10) to (16), in which
the oxygen partial pressure during the heat treatment is 0.9 kPa or less.
(18) The method of producing a cobalt ferrite magnetic powder according to any one of (10) to (17), in which
a temperature of the heat treatment is 550° C. or more and 670° C. or less.
(19) The method of producing a cobalt ferrite magnetic powder according to (16), in which the transition metal element is at least one selected from the group consisting of Mn, Ni, Cu, Ta, and Zr.

REFERENCE SIGNS LIST 10 magnetic recording medium
11 base
12 underlayer
13 magnetic layer
14 back layer

The invention claimed is:

1. A cobalt ferrite magnetic powder, comprising:
   magnetic particles that have a uniaxial crystal magnetic anisotropy and contain cobalt ferrite, wherein
   a peak top 2θ of a (3, 1, 1) plane determined by powder X-ray diffractometry using a CoKα ray is 41.3° or more and 41.5° or less, and
   some Cos contained in the cobalt ferrite are substituted with at least one selected from the group consisting of Zn, Ge, and a transition metal element other than Fe.

2. The cobalt ferrite magnetic powder according to claim 1, wherein
   a molar ratio (Co/Fe) of Co to Fe is 0.2 or more and less than 0.5.

3. The cobalt ferrite magnetic powder according to claim 1, wherein
   the transition metal element include at least one selected from the group consisting of Mn, Ni, Cu, Ta, and Zr.

4. The cobalt ferrite magnetic powder according to claim 1, wherein
   the transition metal element includes Cu.

5. The cobalt ferrite magnetic powder according to claim 1, wherein
   an average particle size is 25 nm or less.

6. The cobalt ferrite magnetic powder according to claim 1, wherein
   a relative standard deviation of a particle size is 50% or less.

7. The cobalt ferrite magnetic powder according to claim 1, wherein
   a coercive force Hc is 2500 Oe or more.

8. The cobalt ferrite magnetic powder according to claim 1, wherein
   SFD (Switching Field Distribution) is 2.0 or less.

9. A tape-shaped magnetic recording medium, comprising:
   a magnetic layer including the cobalt ferrite magnetic powder according to claim 1.

10. A method of producing a cobalt ferrite magnetic powder, comprising:
    melting a component for forming glass and a component for forming a cobalt ferrite magnetic powder and then quenching the components to prepare an amorphous body; and
    performing heat treatment on the amorphous body to precipitate the cobalt ferrite magnetic powder, wherein
    the cobalt ferrite magnetic powder includes magnetic particles having a uniaxial crystal magnetic anisotropy and containing cobalt ferrite,
    a peak top 2θ of a (3, 1, 1) plane determined by powder X-ray diffractometry using a CoKα ray is 41.3° or more and 41.5° or less,
    some Cos contained in the cobalt ferrite are substituted with at least one selected from the group consisting of Zn, Ge, and a transition metal element other than Fe, and
    oxygen partial pressure during the heat treatment is 1.0 kPa or less.

11. The method of producing a cobalt ferrite magnetic powder according to claim 10, wherein
    the component for forming glass contains sodium borate.

12. The method of producing a cobalt ferrite magnetic powder according to claim 11, wherein
    the component for forming glass further contains at least one of an oxide of an alkaline earth metal or a precursor of the oxide.

13. The method of producing a cobalt ferrite magnetic powder according to claim 12, wherein
    the oxide of an alkaline earth metal includes at least one of calcium oxide, strontium oxide, or barium oxide.

14. The method of producing a cobalt ferrite magnetic powder according to claim 12, wherein
    the oxide of an alkaline earth metal includes at least one of strontium oxide or barium oxide.

15. The method of producing a cobalt ferrite magnetic powder according to claim 11, wherein
    a ratio of the sodium borate to a total amount of the component for forming glass and the component for forming a cobalt ferrite magnetic powder is 35 mol % or more and 60 mol % or less.

16. The method of producing a cobalt ferrite magnetic powder according to claim 10, wherein
    the component for forming a cobalt ferrite magnetic powder contains
    at least one of cobalt oxide or a precursor of the cobalt oxide,
    iron oxide, and
    at least one selected from the group consisting of an oxide of a transition metal element other than Co and Fe, a precursor of the oxide of a transition metal element other than Co and Fe, zinc oxide, a precursor of zinc oxide, germanium oxide, and a precursor of germanium oxide.

17. The method of producing a cobalt ferrite magnetic powder according to claim 10, wherein
    the oxygen partial pressure during the heat treatment is 0.9 kPa or less.

18. The method of producing a cobalt ferrite magnetic powder according to claim 10, wherein
    a temperature of the heat treatment is 550° C. or more and 670° C. or less.

19. The method of producing a cobalt ferrite magnetic powder according to claim 16, wherein
    the transition metal element is at least one selected from the group consisting of Mn, Ni, Cu, Ta, and Zr.

* * * * *